United States Patent
Kimura

[11] Patent Number: 5,974,926
[45] Date of Patent: Nov. 2, 1999

[54] SHEAR ASSEMBLY FOR USE WITH A PUNCH PRESS FOR CUTTING L SECTIONED STEEL STRIPS

[75] Inventor: Kiyoshi Kimura, Fujisawa, Japan

[73] Assignee: Kabushiki Kaisha Ogura, Kanagawa-Ken, Japan

[21] Appl. No.: 08/897,356

[22] Filed: Jul. 21, 1997

Related U.S. Application Data

[63] Continuation of application No. 08/530,756, Sep. 19, 1995, abandoned.

[30] Foreign Application Priority Data

Mar. 2, 1995 [JP] Japan .................................. 7-017114

[51] Int. Cl.$^6$ ........................................ B26D 7/01
[52] U.S. Cl. ............................ 83/451; 83/465; 83/466.1; 83/467.1; 83/581; 83/588; 83/618; 83/639.1; 83/694
[58] Field of Search ......................... 83/451, 465, 466.1, 83/467.1, 563, 588, 581, 639.1, 694, 620, 618, 143, 917, 180, 210, 228, 287, 288, 902

[56] References Cited

U.S. PATENT DOCUMENTS

| | | | |
|---|---|---|---|
| 858,703 | 7/1907 | Castle | 83/694 |
| 919,874 | 4/1909 | John | 83/694 |
| 1,389,881 | 9/1921 | Kraut | 83/465 |
| 3,077,134 | 2/1963 | Ronick | 83/620 X |
| 3,150,551 | 9/1964 | Spengler et al. | 83/694 |
| 3,468,206 | 9/1969 | Bakula | 83/599 |
| 3,516,317 | 6/1970 | Sundquist et al. | 83/694 |
| 3,735,907 | 5/1973 | Kuchar et al. | 83/465 |
| 3,771,401 | 11/1973 | Jasinski | 83/563 |
| 4,041,753 | 8/1977 | Hix . | |
| 4,082,026 | 4/1978 | Miyazaki | 83/465 |
| 4,276,764 | 7/1981 | Kozhevnikov et al. | 83/618 X |
| 4,662,207 | 5/1987 | McDonald | 83/639.1 |
| 5,233,749 | 8/1993 | Saito et al. | 83/639.1 |
| 5,598,737 | 2/1997 | Oide | 83/917 X |

FOREIGN PATENT DOCUMENTS

| | | | |
|---|---|---|---|
| 1 92 312 | 3/1907 | Germany . | |
| 3707175 | 9/1988 | Germany | 83/694 |
| 43 08 997 | 10/1994 | Germany . | |
| 22336 | 10/1908 | United Kingdom | 83/581 |

*Primary Examiner*—M. Rachuba
*Assistant Examiner*—Charles Goodman
*Attorney, Agent, or Firm*—Dickstein Shapiro Morin & Oshinsky LLP

[57] ABSTRACT

A shear assembly to be replaceably installed in a portable, hydraulic punch press for cutting L sectioned steel strips at, typically, 45 degrees preparatory to combining them into rectangular frames at sites of construction. The shear assembly comprises a fixed shear in the shape of a female V with an apex angle of 90 degrees, and a movable shear in the shape of a male V movable up and down past the fixed shear. Formed in fixed relation to the fixed shear is a work rest having a pair of contact surfaces with a ridge therebetween in alignment with the apex of the fixed shear. The contact surfaces of the work rest are so positioned and angled that the opposite ends of an L sectioned steel strip can be cut off into angles of symmetrical shape. An alternate embodiment is disclosed.

17 Claims, 14 Drawing Sheets

SHEAR ASSEMBLY FOR USE WITH A PUNCH PRESS FOR CUTTING L SECTIONED STEEL STRIPS

This application is a continuation of application Ser. No. 08/530,756 filed Sep. 19, 1995, now abandoned.

BACKGROUND OF THE INVENTION

This invention relates to apparatus for shearing work such as, typically, steel beams or strips of L shaped cross section. More specifically, the invention pertains to an assembly of shears and associated means to be replaceably mounted to a portable, hydraulic punch press. The shear assembly according to the invention is particularly well adapted for use in cutting L sectioned steel strips at 45 degrees or other angles preparatory to combining them into rectangular frames at sites of construction.

The need arises at construction sites for cutting off the ends of L sectioned steel strips at 45 or 135 degrees and joining them end to end into rectangular frames with flanges directed inward or outward. Conventionally, rotary cutters or cutting presses were employed to this end. Such conventional machines were mostly not portable but were permanently installed, and the work was set at required angles to the cutting lines of the machines.

An objection to the prior art cutting machines is that they require skilled workers for setting the work exactly at required angles. The machines are so bulky and heavy, moreover, that they could not possibly be transported to construction or other sites for cutting steel strips in situ. The cutting presses are additionally objectionable because they cut by punching, not by shearing, so that the punchings created were wasted.

SUMMARY OF THE INVENTION

The present invention seeks to provide a compact apparatus whereby L sectioned steel strips or the like can be sheared at any required angles, and with the opposite ends shaped symmetrically, without demanding skill on the part of the operator.

The invention also seeks to permit ready replacement of shears for cutting work at different angles.

The invention also seeks to effectively support the shears against bending moments exerted thereon in cutting heavy work.

Briefly, the invention may be summarized as a shear assembly for use with a punch press for cutting work such as L sectioned steel strips at a desired angle. The blade assembly comprises support means to which there are mounted a first shear in the shape of a female V, with an apex angle of 90 degrees, and a second shear in the shape of a male V mounted to the support means. Either of the first and the second shears is capable of linear reciprocation relative to the other and to the support means in a predetermined direction and in a predetermined plane for cutting work by shearing action between the two shears. Also included is a work rest which is formed on the support means and which has a pair of contact surfaces, for contact with the work, with a ridge therebetween in alignment with the apex of the first shear. Each contact surface of the work rest is disposed at a desired angle at which the work is to be sheared, with respect to the predetermined plane and as seen in the predetermined direction, and at an angle of 45 degrees with respect to the predetermined direction.

In one embodiment of the invention it is the first shear that is fixed to the support means, and the second shear travels up and down relative to the first shear. In another embodiment the second shear is fixed to the support means, and the first shear travels up and down relative to the second shear.

Either way, work such as an L sectioned steel strip can therefore be readily sheared at the desired angle of, say, 45 or 135 degrees merely by being set upon the work rest. Further the V shaped shears in combination with the work rest with the pair of contact surfaces enable the opposite ends of the work to be cut into symmetrical shape.

According to another feature of the invention, a shear backing is formed on the support means for backing up the second shear which is particularly susceptible to deformation or other damage as a result of the bending moment exerted thereon during shearing. With the second shear thus effectively reinforced, the shear assembly can handle very thick steel strips.

It is recommended that the shear assembly according to the invention be replaceably installed in a power driven punch press, as will be disclosed in the following detailed description. L sectioned steel strips can then be cut at different angles merely by preparing as many different shear assemblies to be interchangeably mounted to the punch press. The punch press itself can be of relatively compact design, suitable for use at sites of construction.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
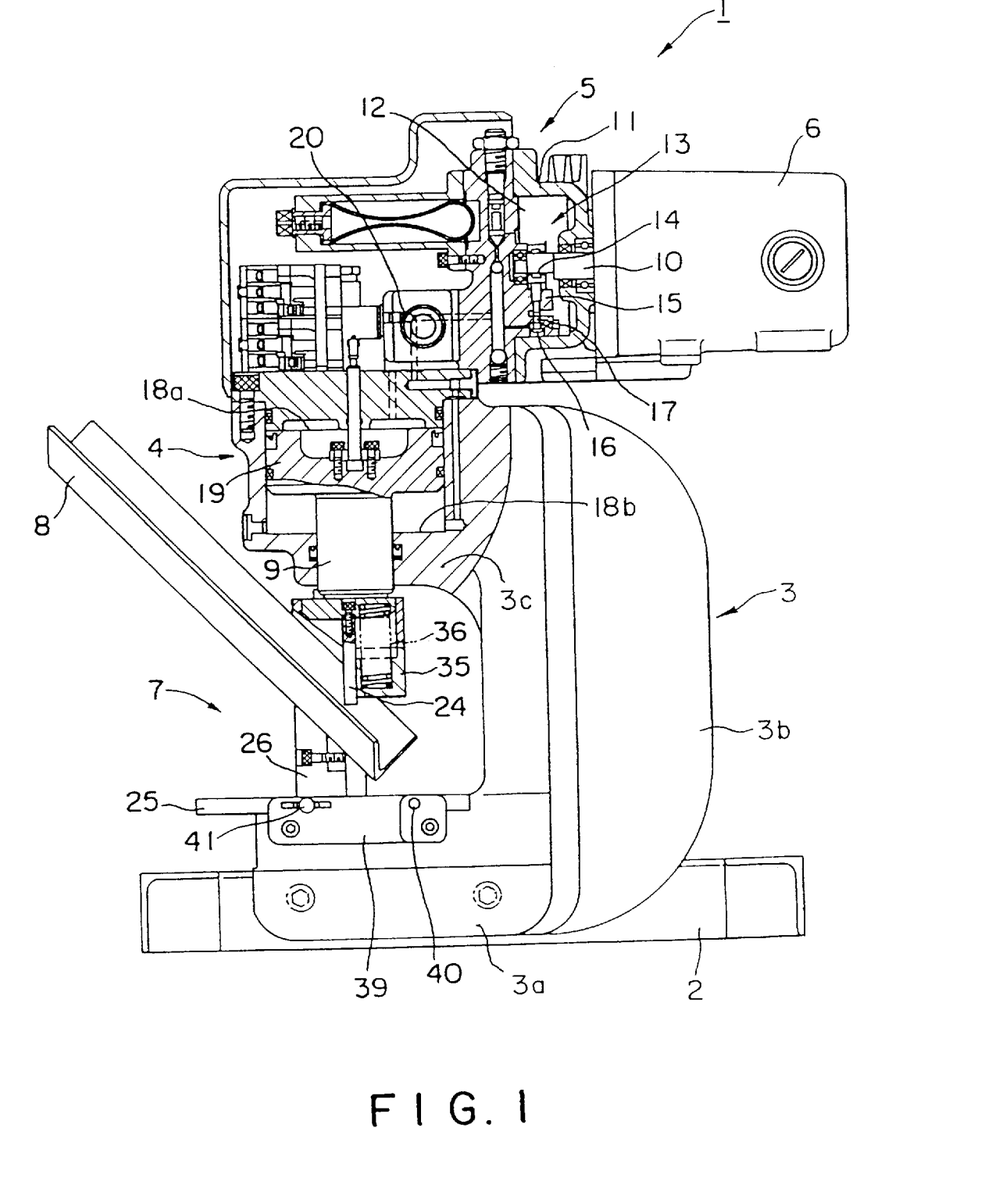
FIG. 1 is an elevation, partly sectioned for clarity, of the shear assembly constructed in accordance with the novel concepts of the invention, the shear assembly being shown mounted to a punch press and itself loaded with an L sectioned steel strip to be cut.
Figure 2:
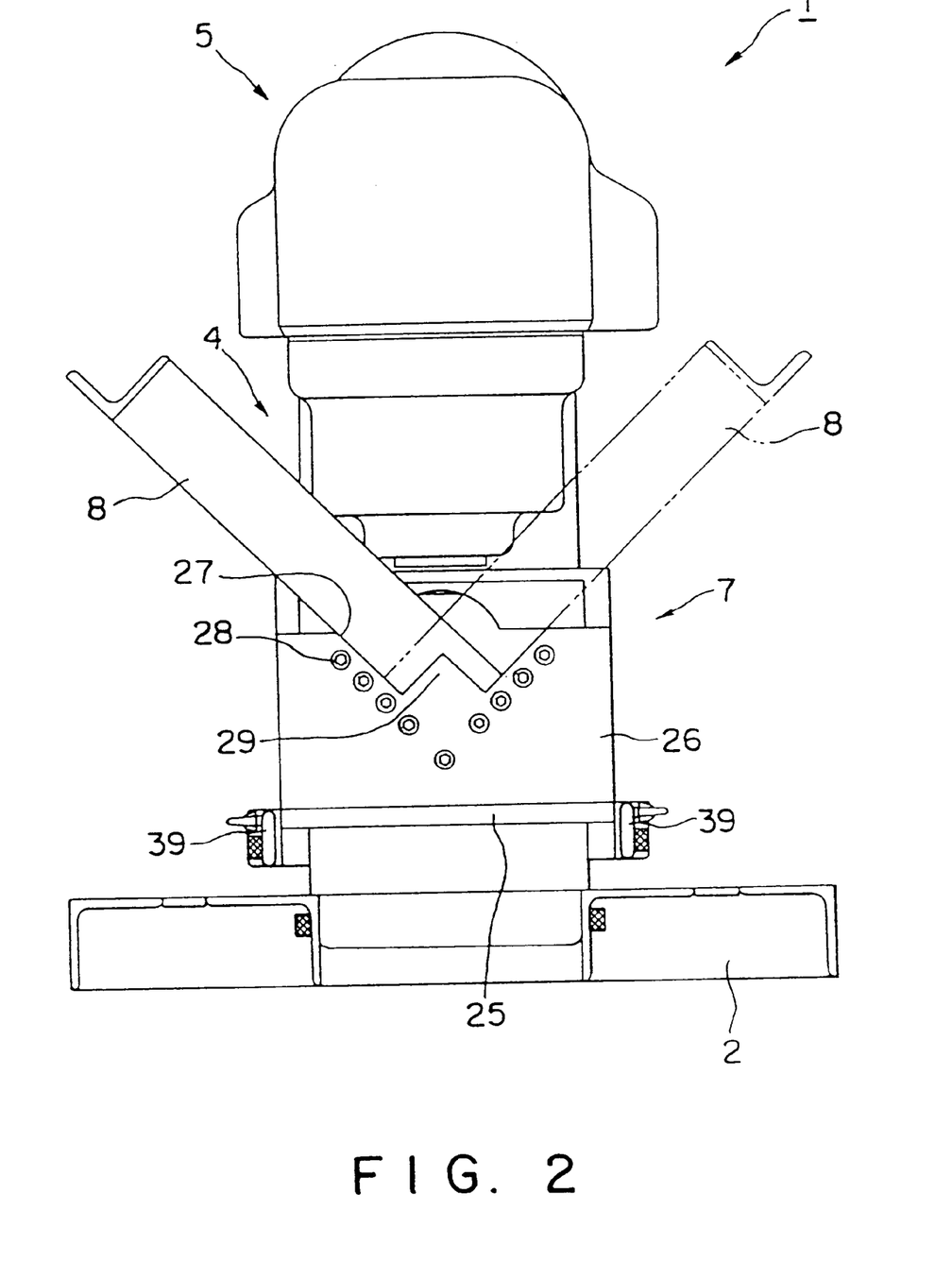
FIG. 2 is a left hand side elevation of the showing of FIG. 1.

The shear assembly according to the invention is particularly well suited for use with the portable, hydraulic punch press shown in FIGS. 1 and 2 and therein generally designated 1. Broadly, the punch press 1 comprises a bed 2 laid horizontally, a C frame 3 erected on the bed, a double acting hydraulic cylinder 4 mounted fast to the C frame 3 and spaced upwardly from the bed 2, a hydraulic pump 5 mounted directly upon the cylinder 4 for supplying pressurized fluid thereto, an electric drive motor 6 coupled directly to the pump 5, and a shear assembly 7 replaceably mounted between bed 2 and cylinder 4.

The invent ion particularly concerns the novel construction of the shear assembly 7. Driven by the punch press 1, the shear assembly 7 is shown in FIGS. 1 and 2 in the act of cutting off one end of an L sectioned steel strip 8 at an angle of 45 degrees. The punch press itself is capable of use not only with the shear assembly 7 but also with a variety of other interchangeable tool assemblies. The construction of the punch press 1 will be briefly explained prior to the detailed study of the shear assembly 7.

The C frame 3 is so named because it is shaped like the letter "C" as seen in a side view as in FIG. 1. More specifically, the C frame 3 is a one piece construction of a tool mount 3a bolted directly to the bed 2, a column 3b extending upwardly from the tool mount, and an overarm 3c extending horizontally from the top end of the column into a parallel spaced relation with the tool mount. The hydraulic cylinder 4 is built into the overarm 3c, with its piston rod 9 projecting downwardly therefrom for acting on the shear assembly 7 on the tool mount 3a.

Hereinafter in this specification the directional terms such as "front" and "rear", and "forward" and "rearward" will be used with the understanding that the front side of the punch press 1 is shown to the left in FIG. 1 and toward the viewer in FIG. 2. Thus, for example, the column 3b of the C frame 3 extends upwardly from the rear end of the tool mount 3a, and the overarm 3c extends forwardly from the top end of the column. Thanks to this C frame 3, the work 8 can be readily front loaded on and unloaded from the punch press 1, no matter how long it may be.

FIG. 1 indicates that the drive motor 6 is disposed rearwardly of the pump 5, with its axis of rotation extending horizontally, instead of vertically as in the noted prior art. The armature shaft 10 of the drive motor 6 extends into the casing 11 of the pump 5 for driving its pumping means 13 and hence for causing the same to supply a hydraulic fluid, usually oil, from a reservoir 12 into the hydraulic cylinder 4. The pumping means 13 is shown to comprise a rotary cam 14 formed on an extension of the motor armature shaft 10, a piston 15 reciprocated by the cam 14, a check valve 16 which is loaded by a spring 17 to hold normally closed the fluid passageway to the cylinder 4.

The cylinder 4 has a piston 19 slidably but pressure tightly mounted therein, thereby dividing its interior into a head end fluid chamber 18a and a rod end fluid chamber 18b. These fluid chambers communicate with the pump 5 via a directional control valve 20 whereby the pressurized fluid from the pump is directed into either of the fluid chambers 18a and 18b for moving the piston 19, together with the piston rod 9 depending therefrom, up and down relative to the overarm 3c. The piston rod 9 when lowered acts directly on the shear assembly 7 for causing the same to cut the L sectioned steel strip 8 at a required angle, which is 45 degrees in this particular embodiment, as will be detailed subsequently.

Although the shear assembly 7 appears in both FIGS. 1 and 2, it is better illustrated on an enlarged scale in FIGS. 3–12. The shear assembly 7 comprises a first shear 22 in the shape of a female V, and a second shear 24 in the shape of a male V. In this particular embodiment the second shear 24 travels up and down past the first shear 22, so that the first shear will be referred to as the fixed shear, and the second shear as the movable shear. Reference may be had principally to FIGS. 3–7 for consideration of the fixed shear 22 and means associated therewith, and to FIGS. 8–12 for consideration of the movable shear 24 and associated means.

The fixed shear 22 is mounted to a fixed shear support 26 which in turn is erected on a baseplate 25. The fixed shear support 26 has a notch 27 opening upwardly, and the fixed shear 22 is screwed at 28 to the support so as to extend along the support edges bounding the notch. Actually, as will be best understood from FIG. 7, the fixed shear 22 is shown as a combination of two straight shears intersecting at an angle of 90 degrees.

Figure 6A:
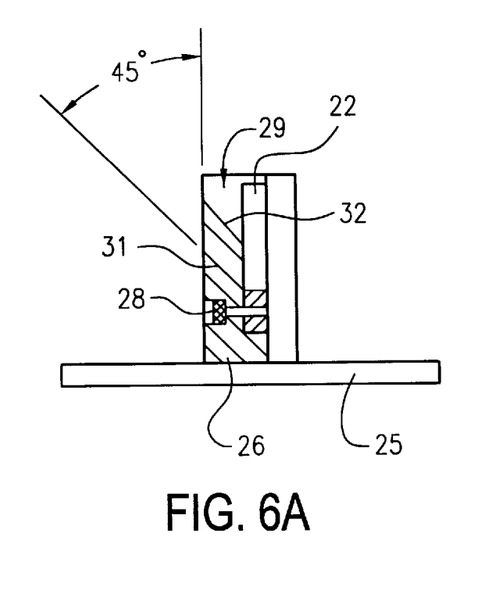
FIG. 6A is a section taken along the line VI—VI in FIG. 5.
Figure 6B:
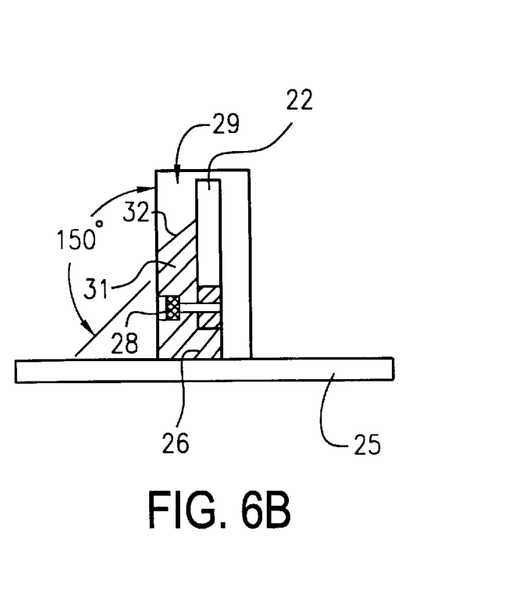
FIG. 6B is a side sectional view of a work rest disposed at an obtuse angle of 150°.
Figure 7:
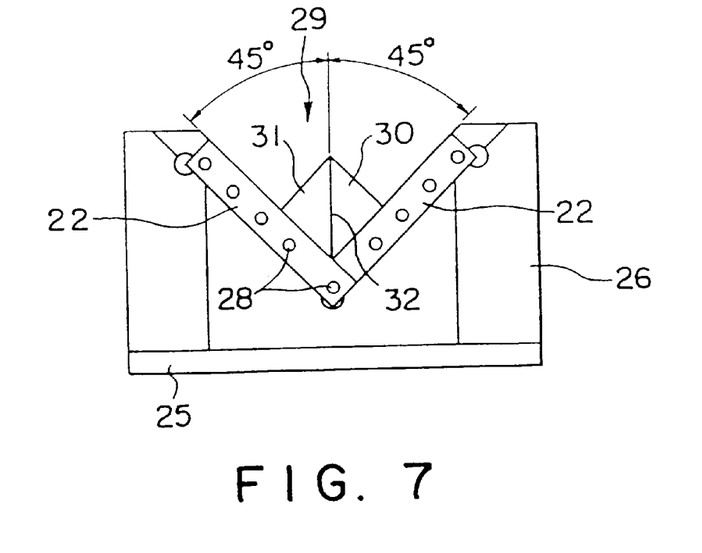
FIG. 7 is a rear elevation of the showing of FIG. 4.

The fixed shear support 26 is formed to include a work rest 29 at the deepest part of the notch 27. The work rest 29 has a pair of flat contact surfaces 30 and 31, for contact with the work 8, with a ridge 32 therebetween in alignment with the apex or intersection of the fixed shear 22. As seen in a plan view as in FIG. 4, each contact surface of the work rest 29 is disposed at an a desired angle Θ at which the work is to be sheared, with respect to the cutting line of the fixed shear 22. Further, as seen in a side view as in FIG. 6A, each contact surface has an angle of 45 degrees with respect to the line of the perpendicular, or to the direction in which the movable shear 24 is to travel. In addition, FIG. 6B illustrates a work rest 29 where the work rest 29 is disposed at an obtuse angle of 150° with respect to the plane in which the moveable shear 24 travels.

With reference to FIGS. 8–12 in particular a movable shear support 34 is fastened to the top of the fixed shear support 26. The movable shear 24 together with a disklike abutment 33 thereon is supported by this support 34 for up and down movement past the fixed shear 22 and on that side of the fixed shear which is opposite to the side where the work rest 29 is provided. The abutment 33 is to receive thrust from the piston rod 9, FIG. 1, of the punch press 1.

Figure 11:
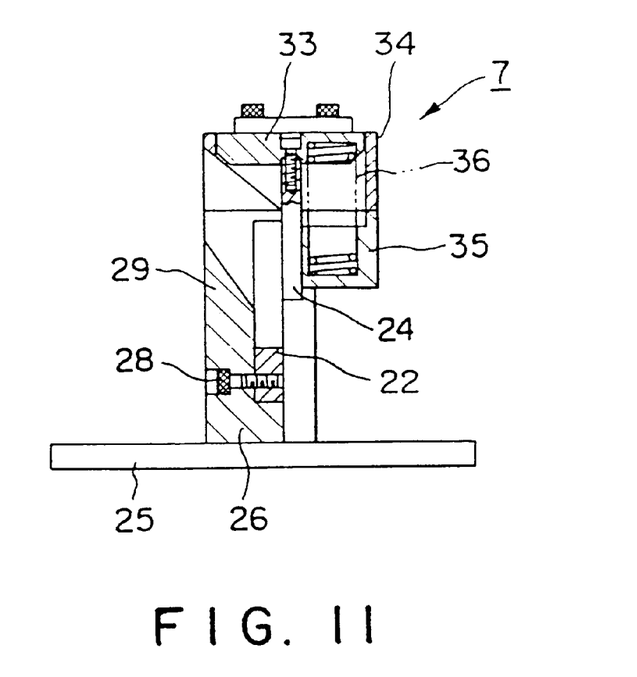
FIG. 11 is a section taken along the line XI—XI in FIG. 10.
Figure 12:
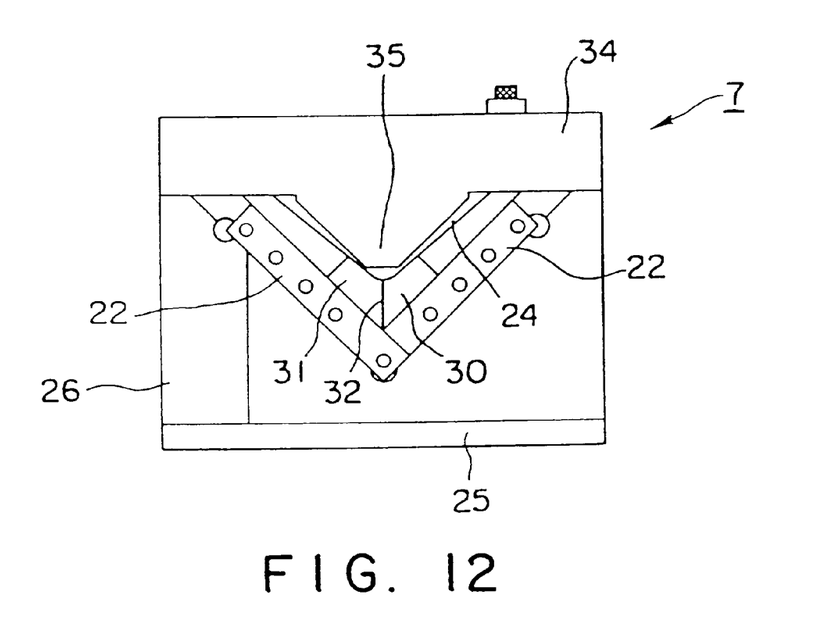
FIG. 12 is a rear elevation of the FIG. 8 shear assembly.

FIGS. 11 and 12 reveal a shear backing 35 which is formed in one piece with, and depends from, the movable shear support 34. The shear backing 35 is relatively slidably held against that side of the movable shear 24 opposite to the side where the fixed shear 22 is provided, thereby protecting the movable shear against destruction or deformation due to bending stresses exerted thereon during shearing. The shear backing 35 serves the additional purpose of housing a helical compression spring 36, FIG. 11, which acts between abutment 33 and shear backing 35 for normally holding the movable shear 24 raised away from the fixed shear 22.

Figure 3:
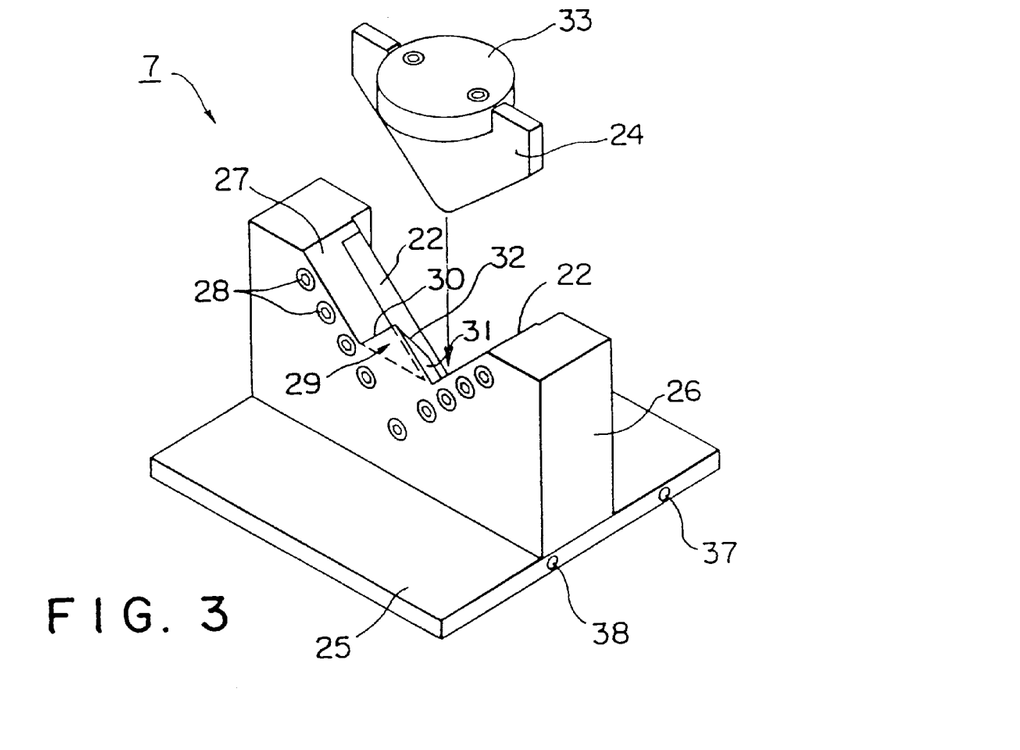
FIG. 3 is an enlarged perspective view of parts of the shear assembly seen in FIGS. 1 and 2.
Figure 4:
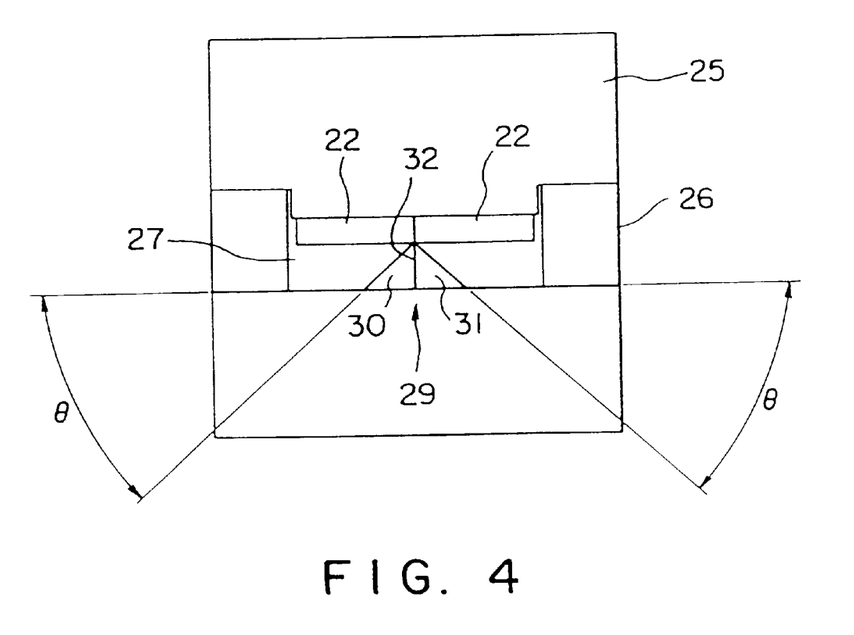
FIG. 4 is a top plan of the fixed shear and some associated means of the shear assembly.
Figure 5:
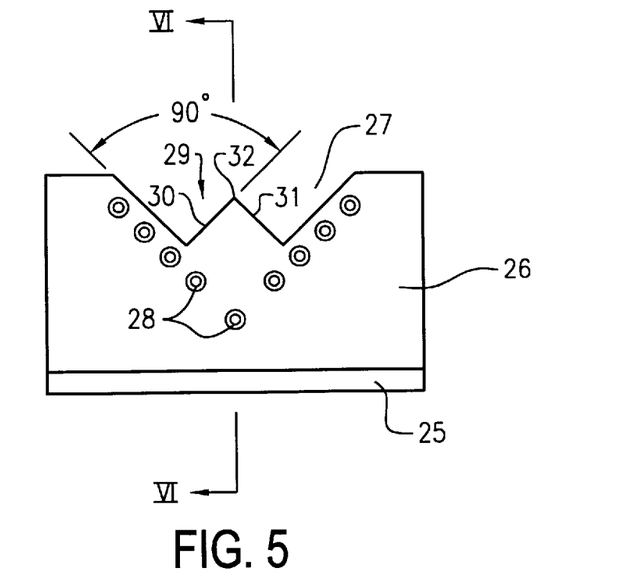
FIG. 5 is a front elevation of the showing of FIG. 4.
Figure 8:
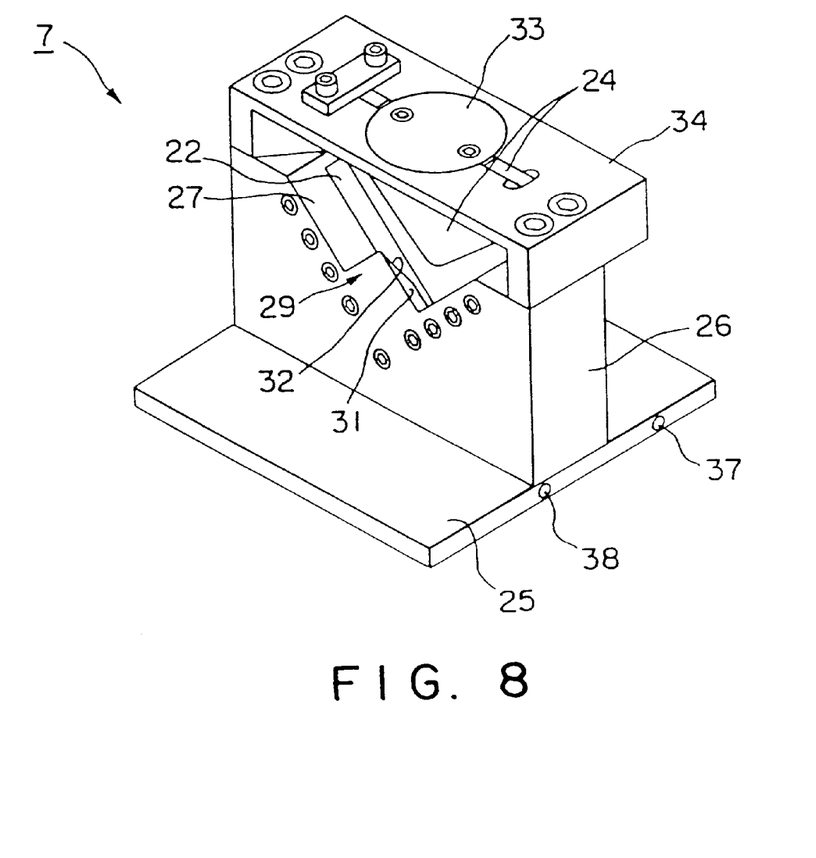
FIG. 8 is a perspective view of the complete shear assembly of FIG. 3.

As seen in both FIGS. 3 and 8, the baseplate 25 has two depressions 37 and 38 formed in one side thereof for the purpose of positioning and mounting the shear assembly 7 on the tool mount 3a, FIG. 1, of the punch press 1. The shear assembly 7 is to be mounted to the punch press 1 by pushing the baseplate 25 into the space between a pair of guides 39, FIGS. 1 and 2, on the tool mount 3a, until a steel ball 40 on one guide 39 becomes engaged in the depression 37. A wing screw 41 on the same guide 39 may then be tightened into engagement in the other depression 38 in the baseplate 25 to complete the mounting of the shear assembly 7.

In use of the shear assembly 7 of the foregoing construction, in combination with the punch press 1, the L sectioned steel strip 8 to be cut may be held against either contact surface 30 or 31 of the work rest 29, that is, as indicated by the solid lines in FIGS. 1 and 2 or by the broken lines in FIG. 2, depending upon the orientation of the angle to be created.

Then the electric drive motor 6 may be switched on. With the consequent rotation of the motor armature shaft 10 together with the cam 14, the piston 15 of the hydraulic pump 5 will pressurize the fluid in the fluid chamber 12. It is understood that the directional control valve 20 is now conditioned to direct the pressurized fluid from the pump 5 into the head end chamber 18a of the cylinder 4. Consequently, the pressurized fluid will force down the piston 19 together with the piston rod 9.

Figure 9:
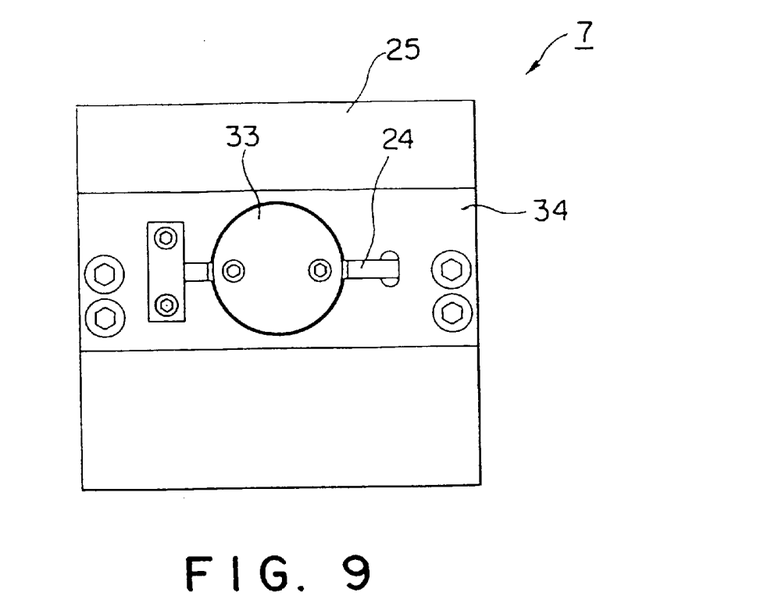
FIG. 9 is a top plan of the FIG. 8 shear assembly.
Figure 10:
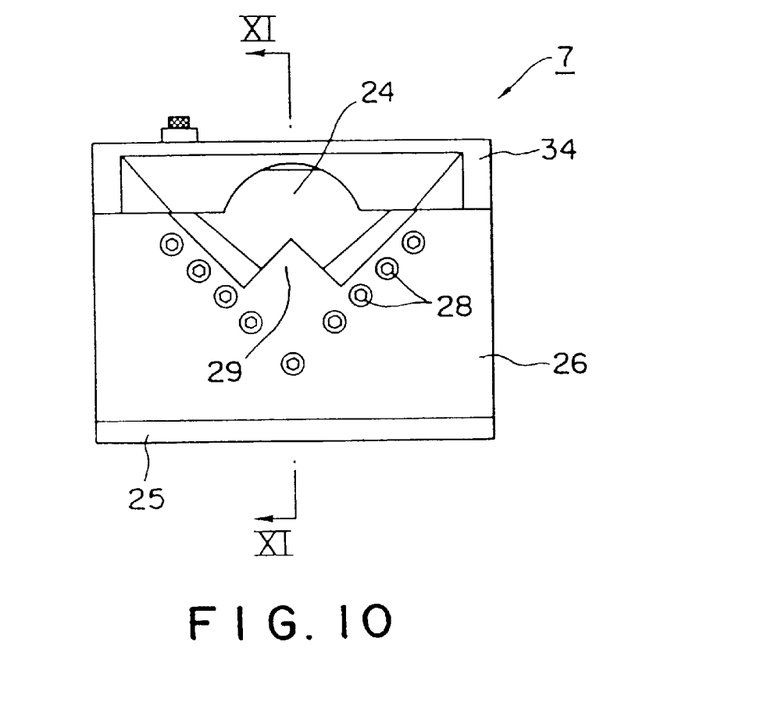
FIG. 10 is a front elevation of the FIG. 8 shear assembly.
Figure 13:
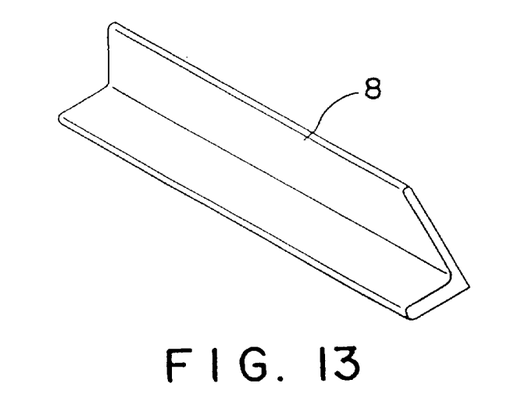
FIG. 13 is a perspective view of an L sectioned steel strip that has been cut by the FIGS. 1 and 2 apparatus.
Figure 14:
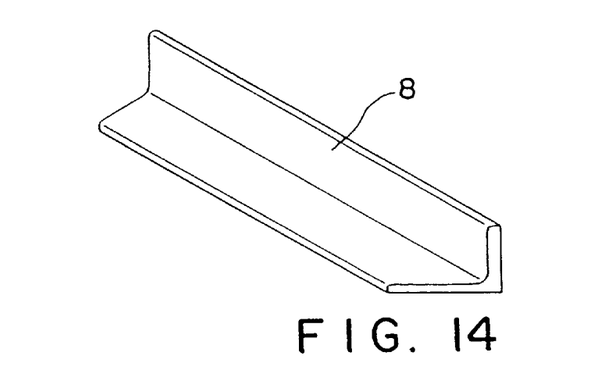
FIG. 14 is a perspective view of another L sectioned steel strip that has been cut by the FIGS. 1 and 2 apparatus.

Thus thrust down, the piston rod 9 will hit the abutment 33, FIGS. 8, 9 and 11, of the shear assembly 7 and thereby depress the movable shear 24 past the fixed shear 22 against the force of the compression spring 36. The steel strip 8 will then be cut at 45 degrees, as shown in FIGS. 13 or 14 depending upon whether the work has been loaded as indicated by the solid or broken lines in FIG. 2.

The directional control valve 20 will be actuated upon full descent of the piston 19 for redirecting the pressurized fluid from the pump 5 into the rod end chamber 18b. Thereupon the piston 19 will ascend with the piston rod 9, permitting the movable shear 24 of the shear assembly 7 to be raised away from the fixed shear 22 by the compression spring 36. One cycle of operation has now been completed.

Figure 15:
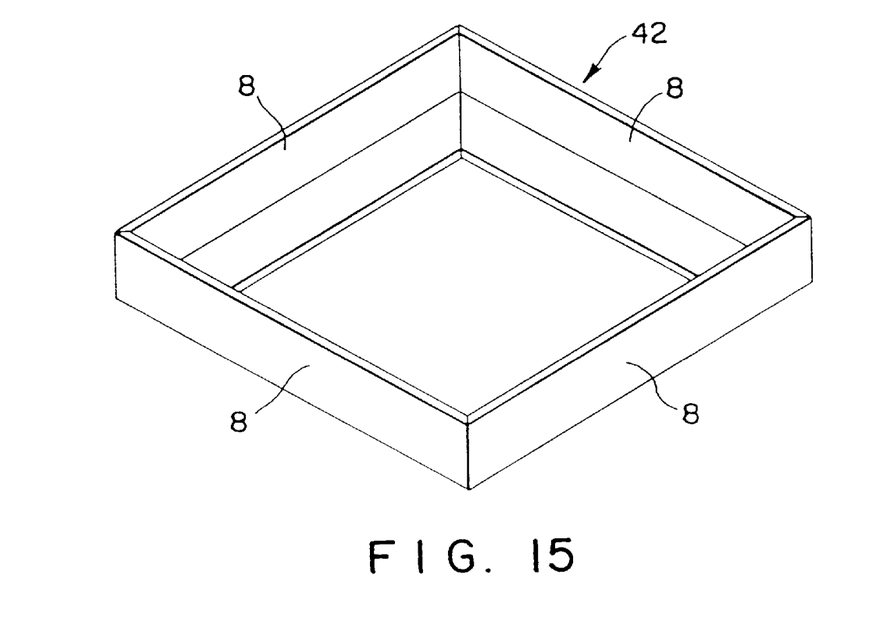
FIG. 15 is a perspective view of a rectangular frame formed by use of the steel strips of FIGS. 13 and 14.

The foregoing cycle may be repeated to prepare four L sectioned steel strips each having its opposite ends cut symmetrically at 45 degrees. Then the strips may be joined end to end to provide a rectangular frame 42, FIG. 15, having inturned flanges.

Figure 16:
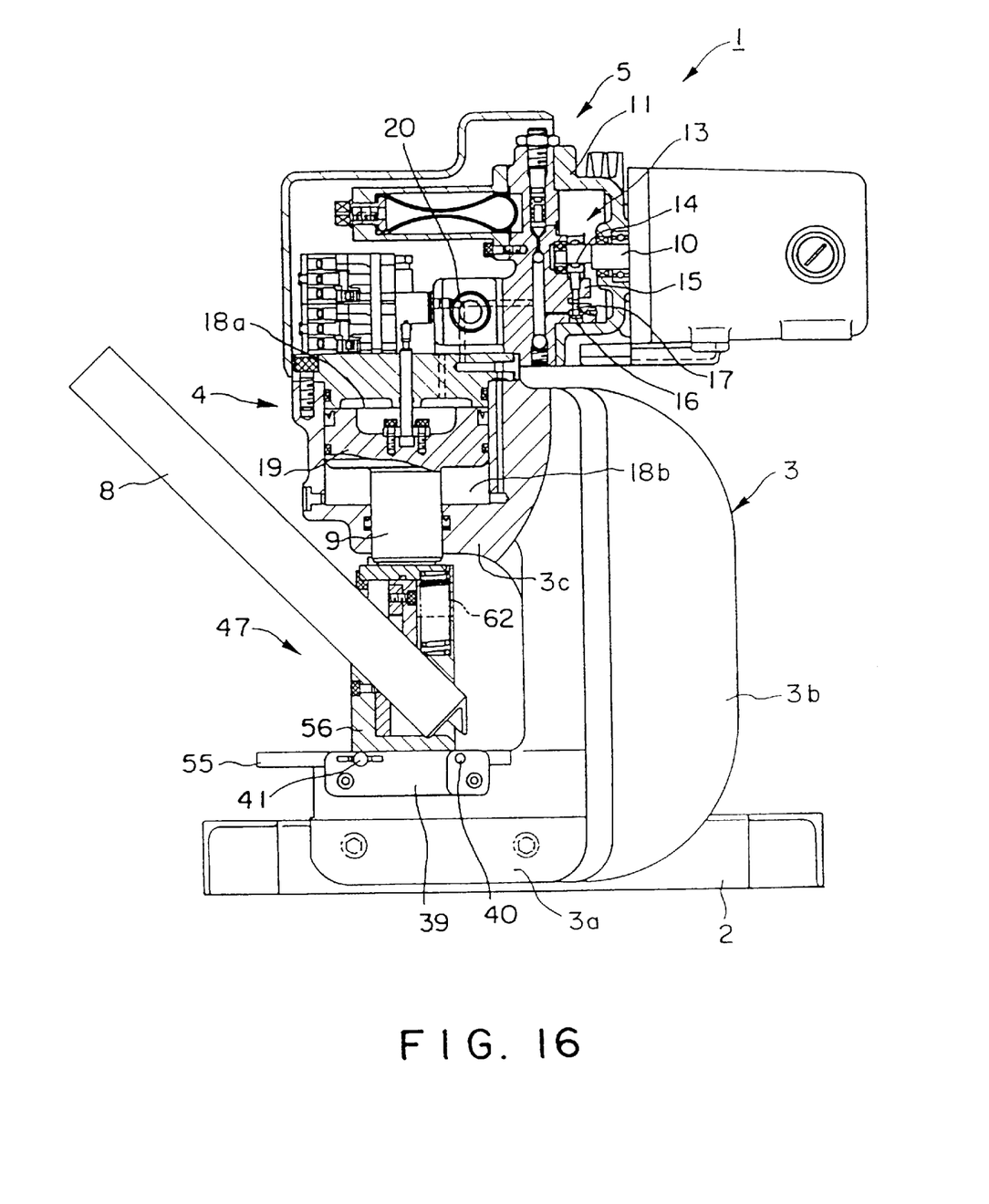
FIG. 16 is a view similar to FIG. 1 but showing an alternate shear assembly according to the invention.
Figure 17:
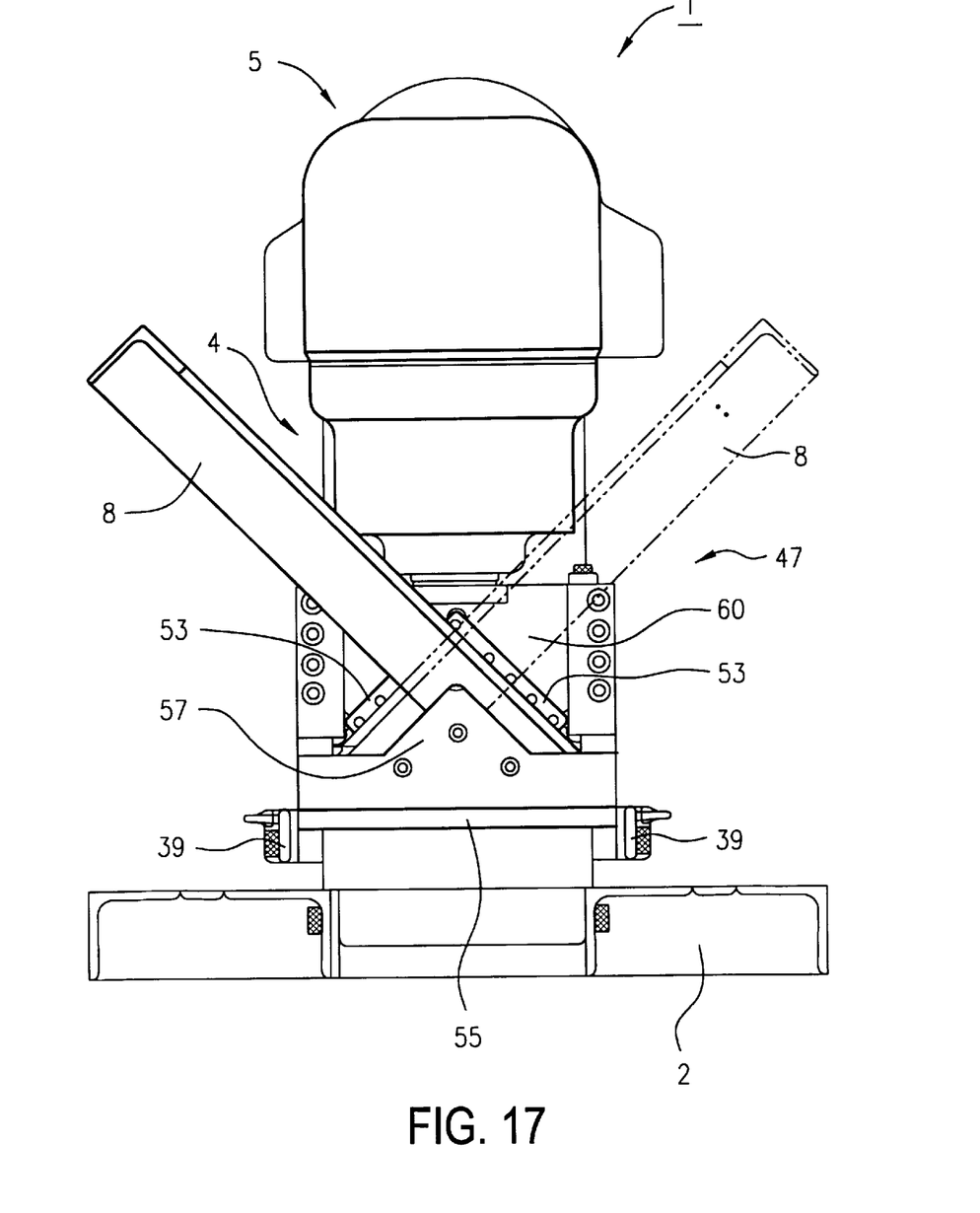
FIG. 17 is a left hand side elevation of the showing of FIG. 16.
Figure 18:
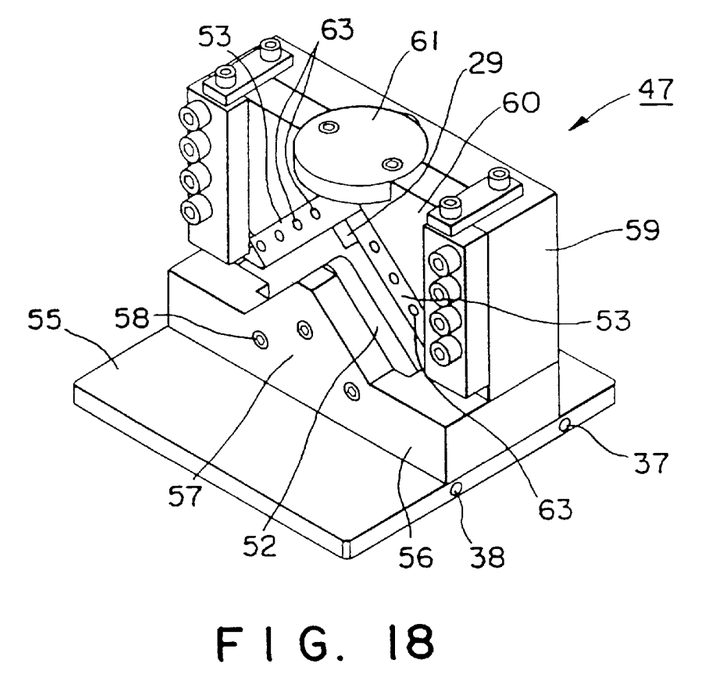
FIG. 18 is an enlarged perspective view of the alternate shear assembly seen in FIGS. 16 and 17.
Figure 19:
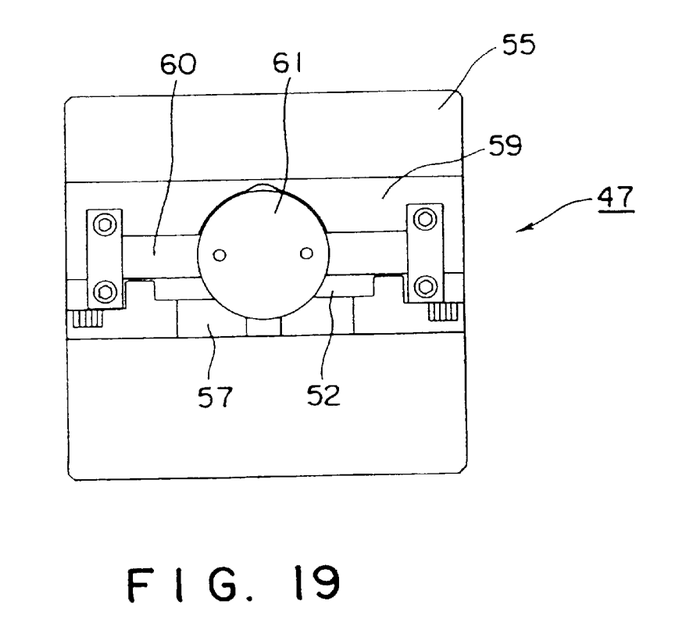
FIG. 19 is a top plan of the FIG. 18 shear assembly.
Figure 20:
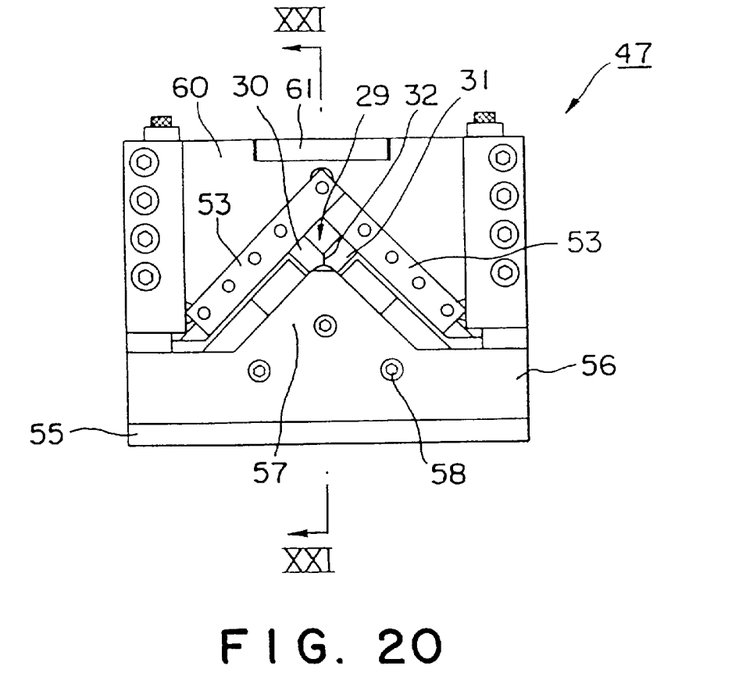
FIG. 20 is a front elevation of the FIG. 18 shear assembly.

FIGS. 16 and 17 show the punch press 1 loaded with a shear assembly 47 of alternate construction according to the invention. Since the punch press is the same in construction with that of FIGS. 1 and 2, only the alternate shear assembly 47 will be described in detail with reference to FIGS. 18–22.

The alternate shear assembly 47 differs from the first disclosed shear assembly 7 in that a shear 52 in the shape of a male V is fixed, and a shear 53 in the shape of a female V travels up and down past the fixed shear. The fixed shear 52 in the shape of a male V is mounted to a fixed shear support 56 on a baseplate 55. The fixed shear support 56 is formed to include a shear backup 57 of the same shape as the fixed shear 52, to which the fixed shear is screwed at 58.

Figure 21:
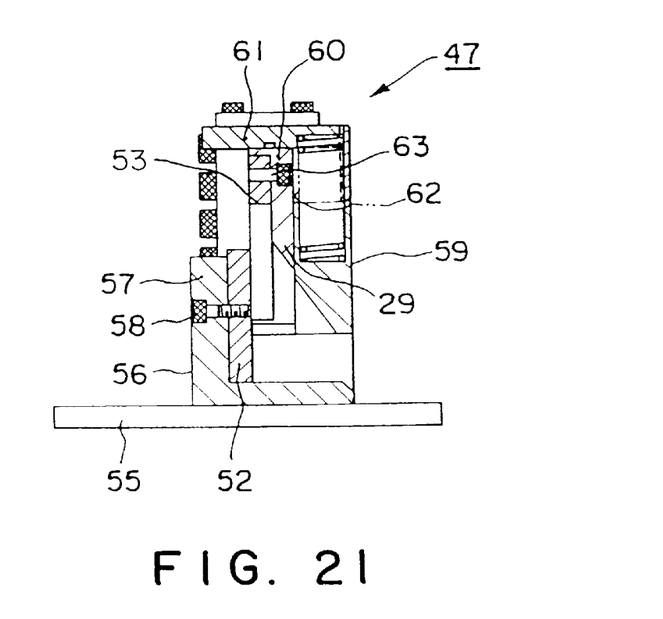
FIG. 21 is a section taken along the line XXI—XXI in FIG. 20.
Figure 22:
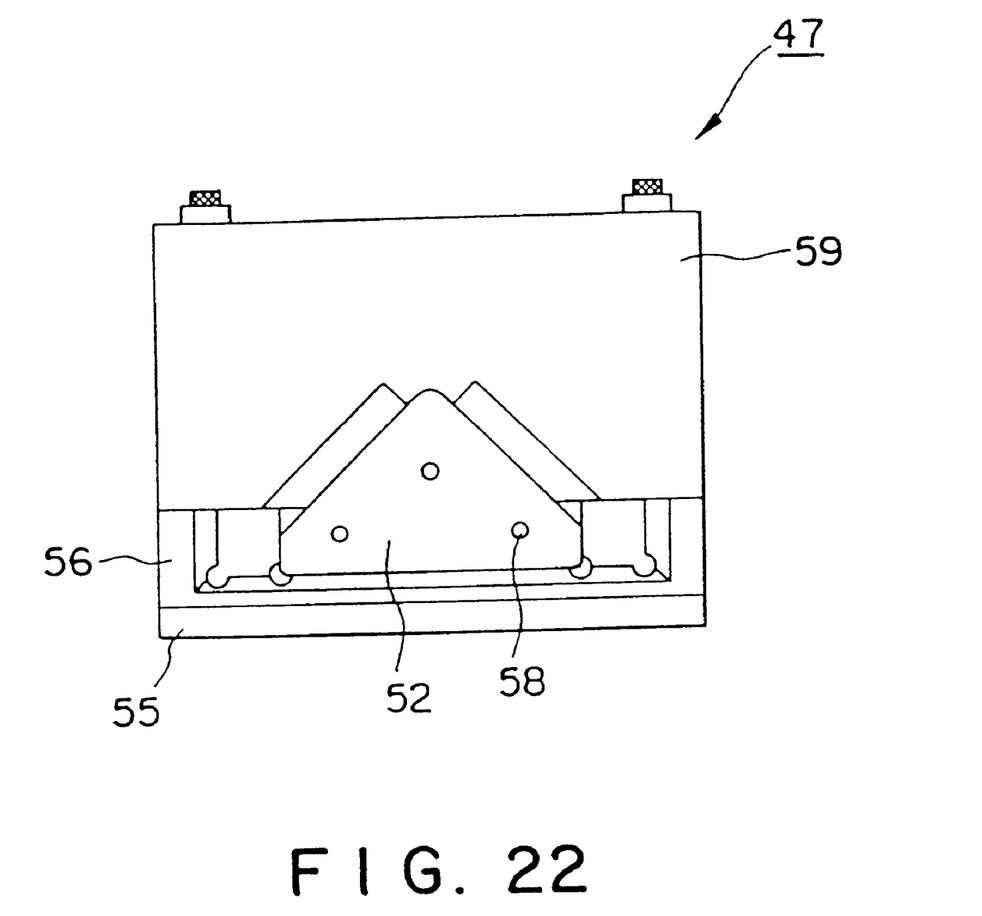
FIG. 22 is a rear elevation of the FIG. 18 shear assembly.

The movable shear 53 in the shape of a female V is fastened at 63 to a movable shear carrier 60, to which is also fastened a disklike abutment 61. Like the fixed shear 22 of the preceding embodiment, the movable shear 53 is a combination of two straight shears intersecting at an angle of 90 degrees. The movable shear carrier 60 is slidably supported by a movable shear support 59 on the fixed shear support 56, so that the movable shear 53 is movable up and down past the fixed shear 52. As depicted in FIG. 21, a helical compression spring 62 acts between shear guide 59 and abutment 61 for biasing the movable shear 53 away from the fixed shear 52.

The movable shear carrier 60 is formed to include a work rest 29 just behind the apex or intersection of the movable shear 53. The work rest 29 has a pair of flat contact surfaces 30 and 31 with a ridge 32 therebetween in alignment with the apex of the movable shear 53. As in the preceding embodiment, each contact surface of the work rest 29 is disposed at a desired angle Θ at which the work is to be cut, with respect to the cutting line of the movable shear 53 as seen in a plan view. Further, as seen in a side view as in FIG. 21, each contact surface has an angle of 45 degrees with respect to the direction of travel of the movable shear 53.

The alternate shear assembly 47 of the foregoing construction can be mounted to the punch press 1 in the same manner as has been set forth in conjunction with the shear assembly 47. Then, as illustrated in FIGS. 16 and 17, the L sectioned steel strip 8 to be cut may be loaded on the shear assembly in the attitude of an inverted V and in contact with either contact surface 30 or 31 of the work rest 29.

Figure 23:
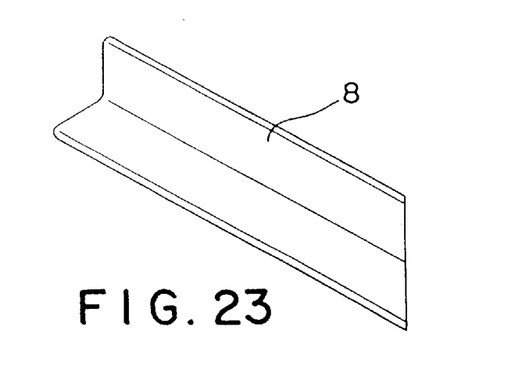
FIG. 23 is a perspective view of an L sectioned steel strip that has been cut by the FIGS. 16 and 17 apparatus.
Figure 24:
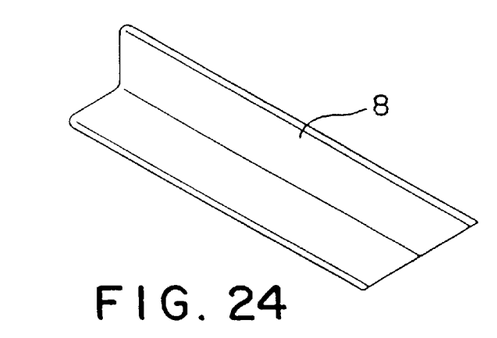
FIG. 24 is a perspective view of another L sectioned steel strip that has been cut by the FIGS. 16 and 17 apparatus.
Figure 25:
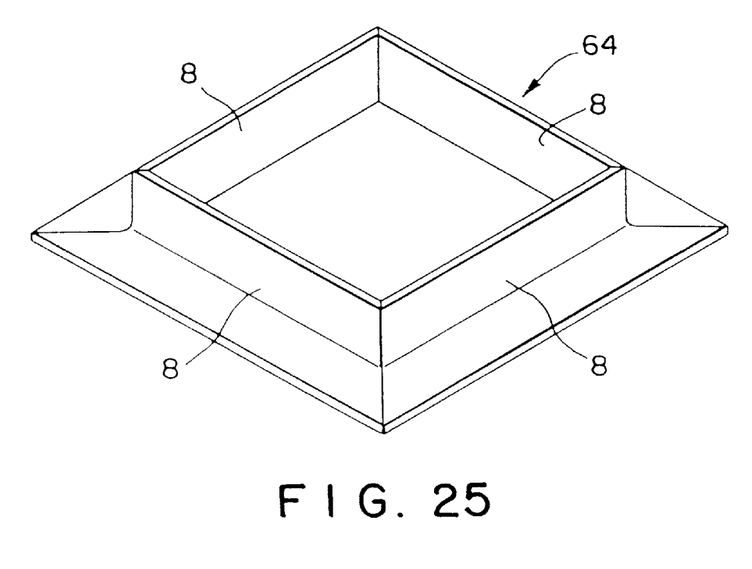
FIG. 25 is a perspective view of a rectangular frame formed by use of the steel strips of FIGS. 23 and 24.

FIGS. 23 and 24 show the steel strips 8 that have been cut at 135 degrees by the shear assembly 47. Such steel strips, each having its opposite ends cut symmetrically by the same shear assembly 47, may be combined as pictured in FIG. 25 to provide a rectangular frame 64 with flanges directed outwardly.

Despite the foregoing detailed disclosure, it is not desired that the invention be limited by the exact showing of the drawings or the description thereof. For example, the cutting angles according to the invention are not limited to 45 and 135 degrees. The angle Θ of the work rest 29 may be suitably determined to provide additional cutting angles of, say, 15, 30, 60, 120 and 150 degrees, thereby making possible the fabrication of triangular or hexagonal frames, in addition to rectangular ones, with flanges directed either inwardly or outwardly. Various other modifications and alterations of the illustrated embodiments may be resorted to without departing from the scope of the invention as expressed in the following claims.

What is claimed is:

1. A shear assembly for use with a punch press for cutting work at a desired angle, the shear assembly comprising:
   (a) a support;
   (b) a first shear having a female V shape, with an apex angle of 90 degrees, mounted to the support;
   (c) a second shear having a male V shape mounted to the support;
   (d) either of the first and the second shears being arranged to move in linear reciprocation relative to the other and to the support in a predetermined direction and in a predetermined plane for cutting work by shearing action between the two shears; and
   (e) a work rest formed on the support and having a pair of contact surfaces with a ridge therebetween in alignment with the apex of the first shear, each contact surface of the work rest being disposed at a desired angle with respect to the predetermined plane and as seen in the predetermined direction, and at an angle of 45 degrees with respect to the predetermined plane, wherein when the work rests on the contact surfaces and the first and second shears move in linear reciprocation to each other, the contact surfaces cause the work to be sheared at only the desired angle.

2. The shear assembly of claim 1 wherein the first shear is fixed to the support, whereas the second shear is mounted to the support for linear reciprocation relative to the first shear.

3. The shear assembly of claim 2 further comprising a shear backing formed on the support and relatively slidably held against the second shear in order to resist a bending moment exerted thereon when the work is sheared.

4. The shear assembly of claim 2 further comprising an abutment formed on the second shear in order to receive thrust from the punch press.

5. The shear assembly of claim 1 wherein the second shear is fixed to the support, whereas the first shear is mounted to the support for linear reciprocation relative to the second shear.

6. The shear assembly of claim 5 further comprising a shear backing formed on the support and held against the second shear in order to resist a bending moment exerted thereon when the work is sheared.

7. The shear assembly of claim 5 further comprising a spring acting between the first shear and the support in order to hold the first shear away from the second shear.

8. The shear assembly of claim 5 further comprising an abutment formed on the first shear in order to receive thrust from the punch press.

9. A shear assembly for use with a punch press for cutting work at a desired angle, the shear assembly comprising:
   (a) a support;
   (b) a first shear having a female V shape, with an apex angle of 90 degrees, mounted to the support;
   (c) a second shear having a male V shape mounted to the support;
   (d) either of the first and the second shears arranged to move in linear reciprocation relative to the other and to the support in a predetermined direction and in a predetermined plane for cutting work by shearing action between the two shears; and
   (e) a work rest formed on the support and having a pair of contact surfaces with a ridge therebetween in alignment with the apex of the first shear, each contact surface of the work rest being disposed at a desired angle with respect to the predetermined plane and as seen in the predetermined direction, and at an angle of 45 degrees with respect to the predetermined plane, wherein when the work rests on the contact surfaces and the first and second shears move in linear reciprocation to each other, the contact surfaces cause the work to be sheared at only the desired angle;
   (f) further comprising a spring acting between the second shear and the support in order to hold the second shear away from the first shear.

10. A shear assembly for use with a punch press for cutting work at a desired angle, the shear assembly comprising:
    (a) a support;
    (b) a first shear having a female V shape, with an apex angle of 90 degrees, mounted to the support;
    (c) a second shear having a male V shape mounted to the support;
    (d) either of the first and the second shears being arranged to move in linear reciprocation relative to the other and to the support in a predetermined direction and in a predetermined plane for cutting work by shearing action between the two shears; and
    (e) a work rest formed on the support and having a pair of contact surfaces with a ridge therebetween in alignment with the apex of the first shear, each contact surface of the work rest being disposed at an obtuse or acute angle with respect to the predetermined plane.

11. The shear assembly according to claim 10, wherein the first shear is fixed to the support and the second shear is mounted to the support for linear reciprocation relative to the first shear.

12. The shear assembly according to claim 11, further comprising a shear backing formed on the support and relatively slidably held against the second shear in order to resist a bending moment exerted thereon when the work is sheared.

13. The shear assembly according to claim 10, wherein said work rest is disposed at an acute angle with respect to the predetermined plane of 45 degrees.

14. The shear assembly according to claim 10, wherein said work rest is disposed at an acute angle with respect to the predetermined plane of 60 degrees.

15. The shear assembly according to claim 10, wherein said work rest is disposed at an acute angle with respect to the predetermined plane of 30 degrees.

16. The shear assembly according to claim 10, wherein said work rest is disposed at an obtuse angle with respect to the predetermined plane of 120 degrees.

17. The shear assembly according to claim 10, wherein said work rest is disposed at an obtuse angle with respect to the predetermined plane of 150 degrees.

* * * * *